(12) United States Patent
Eum et al.

(10) Patent No.: US 9,826,608 B2
(45) Date of Patent: Nov. 21, 2017

(54) STANDBY CURRENT SUPPLIER

(71) Applicant: FAIRCHILD KOREA SEMICONDUCTOR LTD., Bucheon-si (KR)

(72) Inventors: Hyunchul Eum, Seoul (KR); Youngjong Kim, Seoul (KR); Kuo-Hsien Huang, New Taipei (TW); Chih-Chun Chuang, Taichung (TW); Moon Ho Choi, Bucheon-si (KR); Moon Sik Song, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 14/937,038

(22) Filed: Nov. 10, 2015

(65) Prior Publication Data

US 2016/0135272 A1    May 12, 2016

Related U.S. Application Data

(60) Provisional application No. 62/077,398, filed on Nov. 10, 2014.

(51) Int. Cl.
*H05B 33/08* (2006.01)
*H05B 39/04* (2006.01)

(52) U.S. Cl.
CPC ......... *H05B 39/044* (2013.01); *H05B 33/083* (2013.01); *H05B 33/0815* (2013.01); *H05B 33/0845* (2013.01); *Y02B 20/146* (2013.01)

(58) Field of Classification Search
CPC .............. H05B 33/0815; H05B 33/083; H05B 33/0845; H05B 37/02; H05B 37/0812; Y02B 20/347; H02M 3/33507

USPC ... 315/294, 297, 122, 185 R, 186, 192, 193, 315/201, 228, 290, 291, 307
See application file for complete search history.

(56) References Cited

U.S. PATENT DOCUMENTS

| | | | |
|---|---|---|---|
| 8,749,173 B1 | 6/2014 | Melanson et al. | |
| 2012/0176055 A1* | 7/2012 | Hong | H02M 5/2573 315/200 R |
| 2012/0299572 A1* | 11/2012 | Eom | H05B 33/0815 323/312 |
| 2012/0319621 A1* | 12/2012 | Sutardja | H05B 33/0815 315/307 |
| 2013/0343090 A1* | 12/2013 | Eom | H02M 3/33507 363/16 |
| 2014/0001979 A1* | 1/2014 | Mercier | H05B 37/02 315/307 |
| 2014/0159616 A1* | 6/2014 | Wang | H05B 33/0848 315/307 |
| 2014/0239849 A1* | 8/2014 | Del Carmen, Jr. | H05B 33/0815 315/307 |

(Continued)

*Primary Examiner* — Douglas W Owens
*Assistant Examiner* — Borna Alaeddini
(74) *Attorney, Agent, or Firm* — Okamoto & Benedicto LLP

(57) ABSTRACT

Provided is a standby current supplier including a bleeding circuit electrically connected to a dimmer and through which a first current flowing to the dimmer flows when the dimmer is in an off state, and a first controller configured to detect a first voltage corresponding to an input voltage generated by the dimmer and control the bleeding circuit based on the first voltage when the first voltage is lower than a predetermined first level.

15 Claims, 4 Drawing Sheets

(56) References Cited

U.S. PATENT DOCUMENTS

| | | | | |
|---|---|---|---|---|
| 2014/0333228 A1* | 11/2014 | Angeles | ............ | H05B 33/0815 |
| | | | | 315/291 |
| 2015/0173145 A1* | 6/2015 | Lee | .................... | H05B 33/0815 |
| | | | | 315/200 R |
| 2015/0312978 A1* | 10/2015 | Vaughan | ............ | H05B 33/0815 |
| | | | | 315/123 |
| 2015/0319818 A1* | 11/2015 | Kahlman | ............ | H05B 33/0845 |
| | | | | 315/201 |
| 2015/0366018 A1* | 12/2015 | Kuang | ................ | H05B 33/0848 |
| | | | | 315/206 |
| 2016/0081151 A1* | 3/2016 | Wang | ................ | H05B 33/0818 |
| | | | | 315/186 |
| 2016/0081153 A1* | 3/2016 | Wang | ................ | H05B 33/0815 |
| | | | | 315/228 |
| 2016/0095174 A1* | 3/2016 | Vaughan | .............. | H05B 33/089 |
| | | | | 315/200 R |

* cited by examiner

STANDBY CURRENT SUPPLIER

CROSS-REFERENCE TO RELATED APPLICATIONS

This application claims priority from U.S. Provisional Application No. 62/077,398, filed on Nov. 10, 2014 with the United States Patent and Trademark Office, the disclosure of which is incorporated herein by reference in its entirety.

BACKGROUND (a) Technical Field

Exemplary embodiments relate to a standby current supplier.

(b) Description of the Related Art

Conduction of a dimmer may be electrically controlled. For example, the dimmer includes a switch and a switch control circuit, and conduction of the dimmer is controlled according to a switching operation. In such a dimmer, the switch control circuit is not turned off and is standing by to control a switching operation even when the dimmer is in an off state.

When the dimmer is in the off state, a current should be supplied to the switch control circuit so that the switch control circuit stands by. In other words, even in the off state, the current should flow to the dimmer whose conduction is electrically controlled, and the current level should be equal to or higher than at least a level required for the standby operation of the switch control circuit.

SUMMARY

Exemplary embodiments are directed to stably operating a dimmer by supplying a current of a suitable level to the dimmer in an off state.

According to embodiments, a standby current supplier includes a bleeding circuit electrically connected to a dimmer and through which a first current flowing to the dimmer flows when the dimmer is in an off state, and a first controller configured to detect a first voltage corresponding to an input voltage generated by the dimmer, and control the bleeding circuit based on the first voltage when the first voltage is lower than a predetermined first level.

A capacitor may be charged by the input voltage, and the first voltage may be a voltage charged in the capacitor. The first controller may be enabled when the first voltage is lower than the first level.

The standby current supplier may further include a second controller configured to control the bleeding circuit when the dimmer is in an on state, and the second controller may be enabled when the first voltage is higher than a predetermined second level.

The standby current supplier may further include a comparator configured to generate an output based on comparing the first voltage with the first level and a predetermined second level, and the first controller may be enabled according to the output of the comparator when the first voltage is lower than the first level.

The first controller may include a switch configured to perform a switching operation according to a signal obtained by inverting the output of the comparator, and transfer the first voltage to the bleeding circuit.

The first controller may include a resistor configured to transfer the first voltage to the bleeding circuit.

The bleeding circuit may include a transistor connected between the input voltage and a ground, and the resistor may be connected between the first voltage and a gate of the transistor.

A holding current for maintaining the dimmer in the on state may flow through the bleeding circuit.

DETAILED DESCRIPTION OF THE EMBODIMENTS

Figure 1:
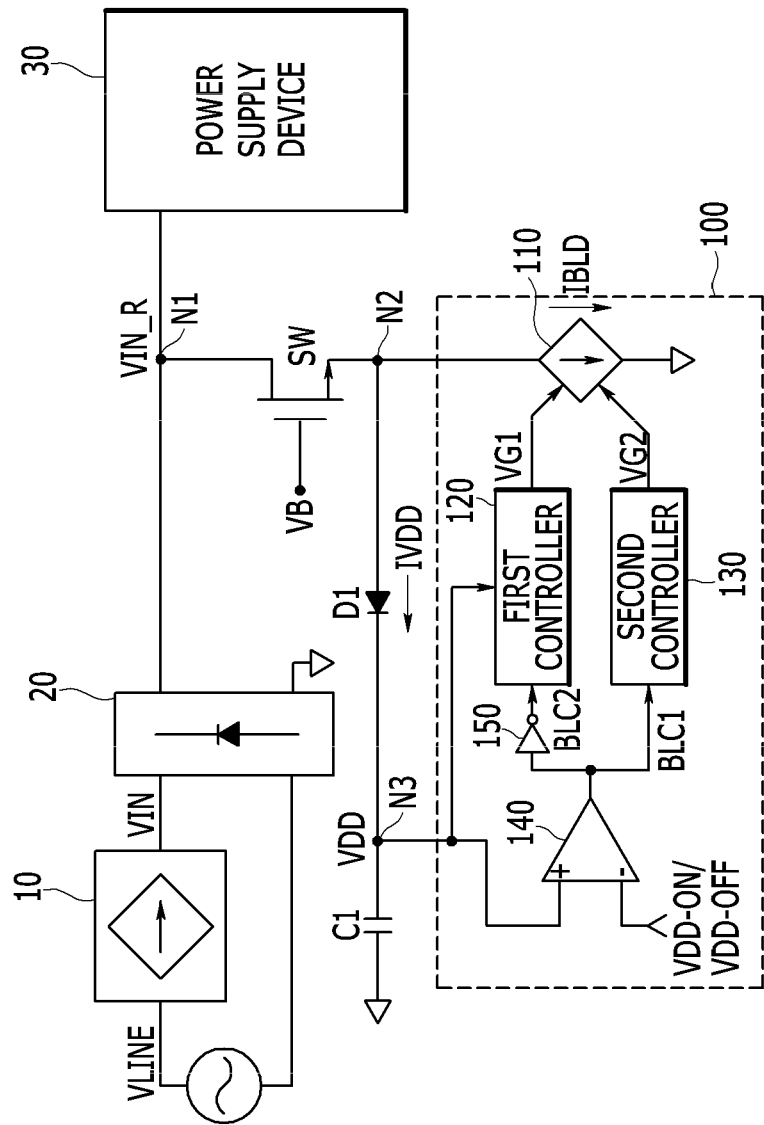
FIG. 1 is a diagram showing an example in which a standby current supplier according to an exemplary embodiment is applied.

Hereinafter, exemplary embodiments of the present invention will be described in detail with reference to the accompanying drawings so that those of ordinary skill in the art may easily implement the present invention. However, the present invention may be embodied in many different forms and should not be construed as being limited to the embodiments set forth herein. In the drawings, parts that are irrelevant to the description will be omitted to clearly describe the present invention, and the same reference numerals will be used throughout to designate the same or like elements.

Throughout the specification, when an element is referred to as being "connected" to another element, the element may be directly connected to the other element or may be "electrically connected" to the other element with intervening elements interposed therebetween. Also, when a portion is referred to as "including" an element, it may further include other elements rather than exclude the other elements unless the context clearly indicates otherwise.

FIG. 1 is a diagram showing an example in which a standby current supplier according to an exemplary embodiment is applied.

As shown in FIG. 1, an alternating current (AC) input is supplied to a power supply device 30 through a dimmer 10 and a rectifier circuit 20.

In an on state, the dimmer 10 according to an exemplary embodiment passes the AC input as a predetermined amount of dimming or a predetermined dimming angle. The AC input passed through the dimmer 10 is transferred to the power supply device 30 through the rectifier circuit 20. When the dimmer 10 is in an off state, the AC input is not passed through the dimmer 10 and is not transferred to the power supply device 30.

When a line voltage VLINE of the AC input passes through the dimmer 10, the line voltage VLINE may be reduced in level or may have a shape which is cut as much as the dimming angle. In the following descriptions, it is assumed that the dimmer 10 passes as much AC input as the dimming angle in an on state. The line voltage VLINE passes through the dimmer 10 to be a voltage VIN, and the voltage VIN passes through the rectifier circuit 20 to be an input voltage VIN_R. At this time, the voltage VIN may be full-wave rectified by the rectifier circuit 20. The input voltage VIN_R is supplied to the power supply device 30, and the power supply device 30 supplies power using the input voltage VIN_R.

When the dimmer 10 is in the off state, a standby current flowing to the dimmer 10 flows through a switch SW. The switch SW is connected between a contact point N1 and a contact point N2, and a bleeding circuit 110 and a diode D1 are connected to the contact point N2. A bias voltage VB is input to a gate of the switch SW, and thus the switch SW may be in the on state irrespective of the state of the dimmer 10.

A cathode of the diode D1 is connected to a contact point N3. One end of a capacitor C1 is connected to the contact point N3, and the other end of the capacitor C1 is connected to a ground. When the diode D1 is conductive, a current flows to the capacitor C1. A voltage VDD of the capacitor C1 is a voltage necessary for operation of a standby current supplier 100.

The voltage VDD may also be a voltage necessary for operation of a control integrated circuit (IC) including the standby current supplier 100. For example, the standby current supplier 100 may be integrated in a control IC (not shown) which controls operation of the power supply device 30, and the voltage VDD may be a voltage necessary for operation of the control IC.

A current passed through the switch SW is supplied to the capacitor C1 through the diode D1 and flows through the bleeding circuit 110. A current IVDD passed through the diode D1 charges the capacitor C1, and the voltage VDD is generated at the capacitor C1.

Even when the dimmer 10 is in the off state, the line voltage VLINE is not completely blocked and influences the voltage VIN. This will be described later with reference to FIG. 3. The voltage VIN changes according to the line voltage VLINE, and the input voltage VIN_R may have a waveform obtained by full-wave rectifying the voltage VIN.

The standby current supplier 100 detects the voltage VDD, and controls operation of the bleeding circuit 110 according to the detected voltage VDD.

A level of the voltage VDD changes according to the on state or off state of the dimmer 10. For example, when the dimmer 10 is in the on state, the voltage VDD is a sufficiently high voltage of an on level VDD_ON or higher. On the other hand, when the dimmer 10 is in the off state, the voltage VDD is a voltage of a level lower than an off level VDD_OFF. The on level VDD_ON and the off level VDD_OFF may be set as reference levels for detecting whether the dimmer 10 is conductive or not. However, exemplary embodiments are not limited thereto, and a voltage level necessary for operation of the control IC including the standby current supplier 100 may be set as a reference level. For example, when the voltage VDD is higher than the on level VDD_ON, the control IC may operate normally, and when the voltage VDD is lower than the off level VDD_OFF, the control IC may not operate.

When the voltage VDD is detected to be higher than the on level VDD_ON, the standby current supplier 100 operates the bleeding circuit 110 normally. When the voltage VDD is detected to be lower than the off level VDD_OFF, the standby current supplier 100 operates the bleeding circuit 110 according to the voltage VDD.

A normal operation of the bleeding circuit 110 indicates an operation of supplying a holding current necessary to maintain the dimmer 10 in the on state. For example, when a current flowing to the dimmer 10 is lower than a predetermined threshold value, the holding current flows from the dimmer 10 through the bleeding circuit 110. When the current flowing to the dimmer 10 is equal to or higher than the predetermined threshold value, the bleeding circuit 110 is disabled so that no current may flow through the bleeding circuit 110.

The standby current supplier 100 includes the bleeding circuit 110, a first controller 120, a second controller 130, a comparator 140, and an inverter 150.

The comparator 140 generates a bleeding control signal BLC1 according to results of comparing the voltage VDD with the on level VDD_ON and the off level VDD_OFF. For example, the voltage VDD is input to a non-inverting terminal (+) of the comparator 140, and the on level VDD_ON and the off level VDD_OFF are input to an inverting terminal (−).

The comparator 140 generates the bleeding control signal BLC1 for enabling the second controller 130 when the voltage VDD is higher than the on level VDD_ON, and generates the bleeding control signal BLC1 for enabling the first controller 120 when the voltage VDD is lower than the off level OFF_VDD.

The inverter 150 inverts the bleeding control signal BLC1 and supplies a bleeding control signal BLC2 to the first controller 120.

For example, the comparator 140 generates a high-level bleeding control signal BLC1 when the voltage VDD is higher than the on level VDD_ON, and generates a low-level bleeding control signal BLC1 when the voltage VDD is lower than the off level VDD_OFF. When the voltage VDD ranges from the on level VDD_ON to the off level VDD_OFF, the comparator 140 maintains an output state. In other words, the level of the bleeding control signal BLC1 is maintained.

The first controller 120 according to an exemplary embodiment is enabled by a high-level bleeding control signal BLC2, and the second controller 130 is enabled by the high-level bleeding control signal BLC1.

When the first controller 120 is enabled, the first controller 120 generates a control signal VG1 based on the voltage VDD.

When the second controller 130 is enabled, the second controller 130 generates a control signal VG2 for controlling the normal operation of the bleeding circuit 110. At this time, the second controller 130 may generate the control signal VG2 according to a result of detecting a bleeding current IBLD.

When the first controller 120 is enabled, the bleeding circuit 110 controls the bleeding current IBLD according to the control signal VG1. When the second controller 130 is enabled, the bleeding circuit 110 controls the bleeding current IBLD according to the control signal VG2.

The bleeding circuit 110 generates the bleeding current IBLD according to one of the control signal VG1 and the control signal VG2. In response to the control signal VG1, the bleeding circuit 110 may generate the bleeding current IBLD according to the voltage VDD.

When the dimmer 10 is in the off state and the voltage VDD is reduced to be lower than the off level VDD_OFF, the comparator 140 generates the low-level bleeding control signal BLC1, and the first controller 120 is enabled. When the dimmer 10 is in the off state, the bleeding current IBLD based on the voltage VDD flows through the bleeding circuit 110. Then, a sufficient standby current may flow through the dimmer 10.

If no current flows through the bleeding circuit 110 when the dimmer 10 is in the off state, the current IVDD flowing to the capacitor C1 through the diode D1 is should be sufficient for the standby current of the dimmer 10. However, due to a very high impedance of the contact point N2, the current IVDD is neither sufficient nor stable for the standby current. Thus, a potential for the dimmer 10 to malfunction arises.

To switch the dimmer 10 from the off state to the on state, a switch control circuit of the dimmer 10 is required to maintain its operation in a standby mode. However, when the standby current is not sufficient or stable, the switch control circuit may not be maintained in the standby mode and may be turned off or malfunction. Therefore, a malfunction in which the dimmer 10 is not switched from the off state to the on state may be caused.

In exemplary embodiments, when the dimmer 10 is in the off state, the dimmer is supplied with a sufficient standby current through the bleeding current IBLD, so that the malfunction of the dimmer 10 may be prevented.

Figure 2:
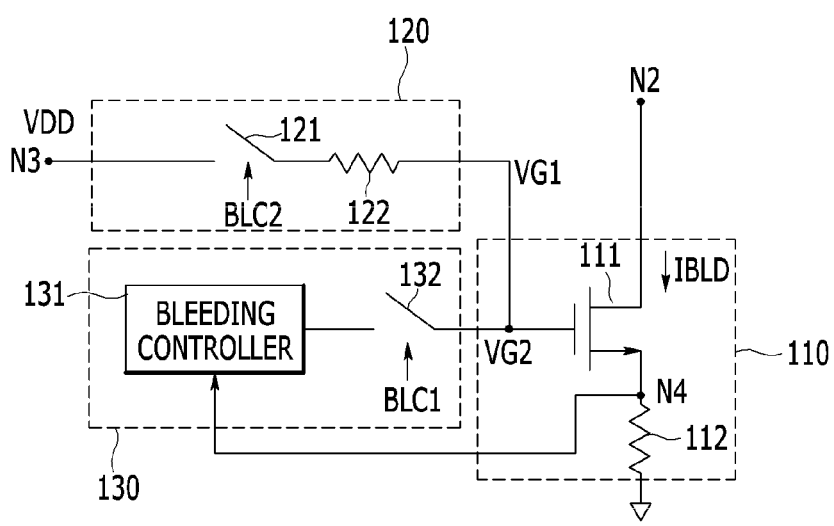
FIG. 2 is a diagram showing an example of a bleeding circuit and first and second controllers according to an exemplary embodiment.

FIG. 2 is a diagram showing an example of a bleeding circuit and first and second controllers according to an exemplary embodiment.

As shown in FIG. 2, the bleeding circuit 110 includes a transistor 111 and a resistor 112. Any one of the control signal VG1 and the control signal VG2 is input to a gate of the transistor 111, a drain of the transistor 111 is connected to the contact point N2, and a source of the transistor 111 is connected to a contact point N4. The resistor 112 is connected between the contact point N4 and the ground. A voltage generated upon flowing of the bleeding current IBLD to the resistor 112 is transferred to a bleeding controller 131 of the second controller 130.

The first controller 120 includes a switch 121 and a resistor 122. One end of the switch 121 is connected to the contact point N3, and the other end of the switch 121 is connected to one end of the resistor 122. The other end of the resistor 122 is connected to the gate of the transistor 111.

The switch 121 performs a switching operation according to the bleeding control signal BLC2. For example, the switch 121 may be turned on by the high-level bleeding control signal BLC2 and turned off by a low-level bleeding control signal BLC2. When the switch 121 is turned on, the contact point N3 and the gate of the transistor 111 are connected through the resistor 122, and the voltage VDD is transferred to the gate of the transistor 111. FIG. 2 shows the first controller 120 including the switch 121, but the first controller 120 may not include the switch 121. In this case, the first controller 120 may be considered to be in a constant enable state, but may have no influence on control of the bleeding circuit 110 when the second controller 130 is enabled. When the resistor 122 has a sufficiently high resistance, very little current flows through the resistor 122, and thus may have no influence on control of the bleeding circuit 110 by the control signal VG2.

The second controller 130 controls operation of the bleeding circuit 110. For example, the second controller 130 may generate the control signal VG2 for flowing the holding current to the bleeding circuit 110, or may disable the bleeding circuit 110.

The second controller 130 includes the bleeding controller 131 and a switch 132. The bleeding controller 131 generates the control signal VG2 for controlling the bleeding current IBLD. For example, the bleeding controller 131 may detect a voltage of the contact point N4 and control the bleeding current IBLD not to exceed a predetermined level, and may generate the control signal VG2 which disables the bleeding circuit 110.

One end of the switch 132 is connected to the bleeding controller 131, and the other end of the switch 132 is connected to the gate of the transistor 111.

The switch 132 performs a switching operation according to the bleeding control signal BLC1. For example, the switch 132 may be turned on by the high-level bleeding control signal BLC1 and turned off by the low-level bleeding control signal BLC1. When the switch 132 is turned on, the control signal VG2 generated by the bleeding controller 131 is transferred to the gate of the transistor 111.

A current source can be coupled between the node N3 and the gate of the transistor 111.

Figure 3:
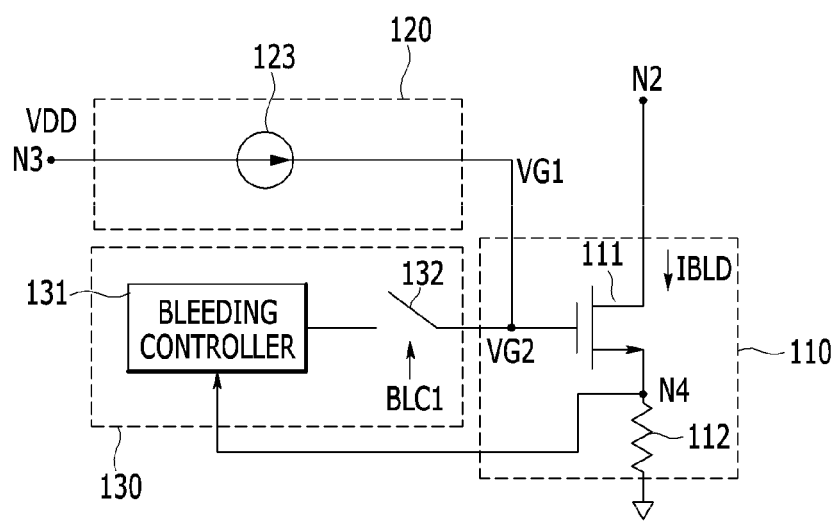
FIG. 3 is a diagram showing an example of first and second controllers according to another exemplary embodiment.

FIG. 3 is a diagram showing an example of first and second controllers according to another exemplary embodiment.

The first controller comprises the current source 123. A current of the current source 123 flows from the node N3 to the gate of the transistor 111. At least one of the switch 121 and the resistor 122 is coupled between the node N3 and the gate of the transistor 111 with the current source 123. The transistor 111 is turned on by the current of the current source 123. The transistor 111 is turned off by the bleeding controller 131. For example, the bleeding controller 131 sinks a current from the gate of the transistor 111 to turn off the transistor 111.

Figure 4:
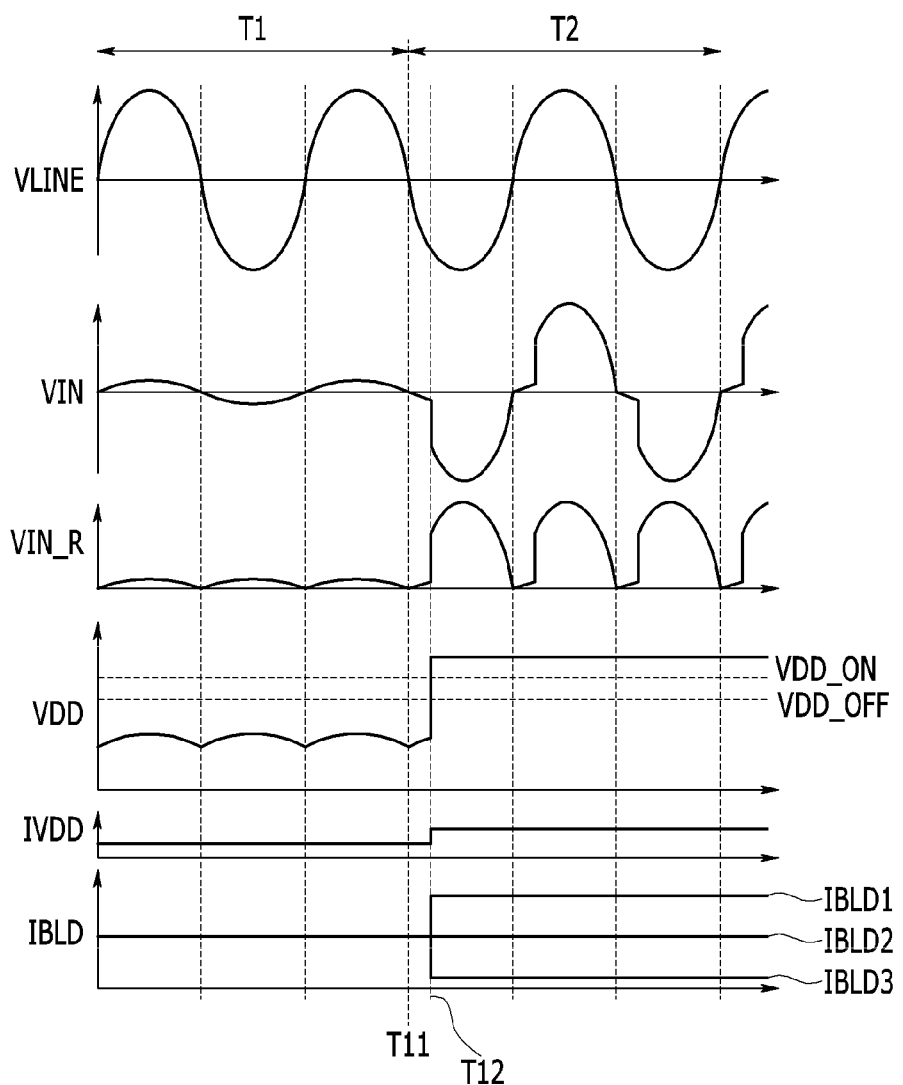
FIG. 4 is a waveform diagram showing voltage and current waveforms according to an exemplary embodiment.

FIG. 4 is a waveform diagram showing voltage and current waveforms according to an exemplary embodiment.

In FIG. 4, the dimmer 10 is in the off state during a period T1, and is in the on state during a period T2.

As shown in FIG. 4, most of the line voltage VLINE does not pass through the dimmer 10 during the period T1. The voltage VIN falls due to the current IVDD and the bleeding current IBLD, and changes within the low voltage range according to the line voltage VLINE, and the voltage VDD is maintained at a predetermined level. As shown in FIG. 4, during the period T1, the fallen voltage VIN has a wave form changing according to variation in the line voltage VLINE. The input voltage VIN_R has a waveform obtained by full-wave rectifying the voltage VIN.

During the period T1, as shown in FIG. 4, the voltage VDD also has a waveform changing according to the input voltage VIN_R, and is lower than the off level VDD_OFF.

Therefore, during the period T1, the comparator 140 generates the low-level bleeding control signal BLC1, and the first controller 120 is enabled by the high-level bleeding control signal BLC2. The bleeding circuit 110 operates according to the control signal VG1. In other words, the bleeding current IBLD flows according to a level of the voltage VDD supplied to the gate of the transistor 111.

When the dimmer 10 is turned on at a time point T11, the voltage VIN is connected to the line voltage VLINE through the dimmer 10. The dimmer 10 passes as much AC input as the dimming angle, and the voltage VIN is generated in a cut waveform as shown in FIG. 4. At a time point T12, as shown in FIG. 4, the voltage VIN falls, and the input voltage VIN_R rises because the input voltage VIN_R has the waveform obtained by full-wave rectifying the voltage VIN.

Then, the current IVDD rises, and the capacitor C1 is charged by the current IVDD, so that the voltage VDD drastically rises at the time point T12 and becomes higher than the on level VDD_ON. Therefore, after the period T12, the comparator 140 generates the high-level bleeding control signal BLC1, and the second controller 130 is enabled by the high-level bleeding control signal BLC1. The bleeding circuit 110 operates according to the control signal VG2. In other words, the bleeding current IBLD flows according to a level of the control voltage VG2 supplied to the gate of the transistor 111.

For example, the bleeding current IBLD may have one of three levels, IBLD1 to IBLD3, according to the control signal VG2. In other words, after the time point T11 at which the dimmer 10 is turned on, the bleeding current IBLD may be higher (IBLD1) or lower (IBLD3) than the bleeding current of the period T1, or may remain constant (IBLD2). FIG. 4 shows only three levels as an example to describe that the bleeding circuit 110 operates under control of the bleeding controller 131 during the period T2 in which the dimmer 10 is in the on state, but exemplary embodiments are not limited thereto.

As described above, in the standby current supplier 100 according to an exemplary embodiment, the bleeding current IBLD simultaneously flows together with the current IVDD for generating the VDD when the dimmer 10 is in the off state, and thus it is possible to supply a sufficient standby current.

Thus far, an exemplary embodiment in which any one of the first controller 120 and the second controller 130 is selectively enabled according to a result of detecting the voltage VDD has been described. However, detection of the voltage VDD is an example for detecting the input voltage VIN_R, and the present invention is not limited thereto. For example, it is possible to selectively enable any one of the first controller 120 and the second controller 130 by detecting the input voltage VIN_R instead of the voltage VDD. Then, a voltage obtained by detecting the input voltage VIN_R is input to the non-inverting terminal (+) of the comparator 140, and predetermined on-level and off-level voltages may be applied to the inverting terminal (−).

It will be apparent to those of ordinary skill in the art that various modifications can be made to the above-descried exemplary embodiments of the present invention without departing from the spirit or scope of the invention. Thus, it is intended that the present invention covers all such modifications provided they come within the scope of the appended claims and their equivalents.

REFERENCE NUMERALS

10: DIMMER
20: RECTIFIER CIRCUIT
30: POWER SUPPLY DEVICE
100: STANDBY CURRENT SUPPLIER

What is claimed is:

1. A standby current supplier comprising:
a bleeding circuit electrically connected to a dimmer and through which a first current flowing to the dimmer flows when the dimmer is in an off state; and
a first controller configured to control the standby current supplier based on a first voltage generated by a second current from a rectified input voltage set by the dimmer,
wherein a flow of the first current through the bleeding circuit is controlled based on a detected level of the first voltage when the detected level of the first voltage is lower than a predetermined first level, and the flow of the first current through the bleeding circuit is controlled based on a detected level of the first current when the detected level of the first voltage is higher than a predetermined second level.

2. The standby current supplier of claim 1, wherein a capacitor is charged by the second current, and
the first voltage is a voltage charged in the capacitor.

3. The standby current supplier of claim 1, wherein the first controller is enabled when the first voltage is lower than the predetermined first level.

4. The standby current supplier of claim 1, further comprising a second controller configured to control the bleeding circuit when the dimmer is in an on state,
wherein the second controller is enabled when the first voltage is higher than the predetermined second level.

5. The standby current supplier of claim 1, further comprising a comparator configured to generate an output based on comparing the first voltage with the predetermined first level and the predetermined second level,
wherein the first controller is enabled according to the output of the comparator when the first voltage is lower than the predetermined first level.

6. The standby current supplier of claim 5, wherein the first controller comprises a switch configured to perform a switching operation according to a signal obtained by inverting the output of the comparator, and transfer the first voltage to the bleeding circuit.

7. The standby current supplier of claim 5, wherein the first controller comprises a resistor configured to transfer the first voltage to the bleeding circuit.

8. The standby current supplier of claim 7, wherein the bleeding circuit comprises a transistor connected between the input voltage and a ground, and
the resistor is connected between the first voltage and a gate of the transistor.

9. The standby current supplier of claim 5, wherein the first controller comprises a current source configured to supply a current to the bleeding circuit.

10. The standby current supplier of claim 5, further comprising a second controller configured to control the bleeding circuit when the dimmer is in an on state,
wherein the second controller is enabled according to the output of the comparator when the first voltage is higher than the second level.

11. The standby current supplier of claim 1, wherein a holding current for maintaining the dimmer in an on state flows through the bleeding circuit.

12. The standby current supplier of claim 1, wherein the first and second currents flow together through a switch that is between a first node that is connected to the rectified input voltage and a second node that is connected to an input of the bleeding circuit.

13. The standby current supplier of claim 12, wherein the switch comprises a transistor, and the first and second currents flow together through a source and a drain of the transistor.

14. The standby current supplier of claim 1, wherein the bleeding circuit comprises a transistor, and the first voltage is applied to a gate of the transistor to control flow of the first current through the transistor when the detected level of the first voltage is lower than the predetermined first level.

15. The standby current supplier of claim 14, wherein a voltage developed by the first current, instead of the first voltage, is applied to the gate of the transistor when the detected level of the first voltage is higher than the predetermined second level.

* * * * *